United States Patent
White et al.

(10) Patent No.: US 6,615,140 B2
(45) Date of Patent: Sep. 2, 2003

(54) OPERATIONAL BRIGHT-BAND SNOW LEVEL DETECTION USING DOPPLER RADAR

(75) Inventors: Allen B. White, Louisville, CO (US); Daniel J. Gottas, Boulder, CO (US); F. Martin Ralph, Arvada, CO (US); Paul J. Neiman, Nederland, CO (US)

(73) Assignees: The United States of America as represented by the Secretary of Commerce, Washington, DC (US); University of Colorado, Boulder, CO (US)

( * ) Notice: Subject to any disclaimer, the term of this patent is extended or adjusted under 35 U.S.C. 154(b) by 0 days.

(21) Appl. No.: 09/941,636

(22) Filed: Aug. 30, 2001

(65) Prior Publication Data

US 2003/0065445 A1 Apr. 3, 2003

(51) Int. Cl.$^7$ ............................................. G06F 169/00
(52) U.S. Cl. ............................................. 702/3; 342/26
(58) Field of Search ........................ 702/3, 4; 342/26, 342/460

(56) References Cited

U.S. PATENT DOCUMENTS

| | | | |
|---|---|---|---|
| 4,014,019 A | 3/1977 | Fetter | 343/5 W |
| 5,406,481 A | 4/1995 | Shinozawa et al. | 364/420 |
| 6,081,221 A | 6/2000 | Zrnic et al. | 342/26 |
| 6,125,328 A | 9/2000 | Baron et al. | 702/3 |
| 6,201,494 B1 * | 3/2001 | Kronfeld | 342/26 |
| 6,252,539 B1 | 6/2001 | Phillips et al. | 342/26 |

OTHER PUBLICATIONS

1. Publication, S–Band Radar Obervations of Coastal Orographic Rain, American Meterological Society, Jul. 1, 2001, Munich, Germany A.B. White et al.

* cited by examiner

*Primary Examiner*—Donald E. McElheny, Jr.
(74) *Attorney, Agent, or Firm*—Thomas Zack

(57) ABSTRACT

A method to detect the bright-band snow level from radar reflectivity and Doppler vertical velocity data collection with an atmospheric profiling Doppler radar. The measurement may be made available to the public through the Internet.

4 Claims, 5 Drawing Sheets

OPERATIONAL BRIGHT-BAND SNOW LEVEL DETECTION USING DOPPLER RADAR

BACKGROUND OF THE INVENTION

This invention relates to a method to detect the bright-band snow level in near real time from radar reflectivity and Doppler vertical velocity data collected with an atmospheric profiling Doppler radar.

Portions of the present invention were disclosed in an extended abstract accompanying a presentation at the 30th International Conference of Radar Meteorology in Munich, Germany, Jul. 19–24, 2001. This abstract was published by the American Meteorological Society of Boston, Mass. on Jul. 1, 2001.

The bright band is a layer of enhanced radar reflectivity resulting from the difference in the dielectric factor for ice and water and the aggregation of ice particles particles as the particles descend and melt. The bright-band height is the altitude of maximum radar reflectivity in the bright band. The layer over which the transformation from ice to water occurs defines the melting layer. The top of the melting layer is the melting level. The melting level is commonly accepted as the altitude of the 0° C. constant-temperature surface (see reference, Glickman, 2000, entitled *Glossary of Meteorology*, AMS, Boston, page 482).

Knowledge of the melting layer is extremely useful to the weather forecast community. One use is to predict and monitor the snow level defined as the lowest level in the atmosphere where snow or ice completely changes to rain. This is in contrast to the surface elevation where snow or ice accumulates on the ground. The snow level coincides with the bottom of the melting layer. Present known methods do not permit the snow level detection using direct or indirect measurement techniques. The bright band height can be measured directly and routinely using Doppler radar and provides a better estimate of the snow level than the melting level because of the time required for snow to melt at temperatures above freezing. The term bright band snow level or BBSL is used herein, rather than simply bright band height, to give the measurement a better meteorological context and to emphasize that the term applies not only to radar meteorology, but to other disciplines, such as weather forecasting.

DESCRIPTION OF THE PRIOR ART

Devices that can be used to measure relationships using radar reflectivity or the like known in the prior art. For example, in U.S. Pat. No. 4,014,019 to Fetter discloses a system for processing the IF portion of a radar return signal to produce a continuous voltage output which is indicative of velocity of precipitation in the radar target range.

U.S. Pat. No. 5,406,481 to Shinozawa et al discloses an apparatus for providing a short time range forecast with relatively high accuracy from weather radar images of cloud reflections data by incorporating physical properties of the cloud in the forecasting method.

U.S. Pat. No. 6,081,221 to Zrnic et al discloses a method of resolving range ambiguities and separating overlaid signals in a Doppler weather radar in which signals are decoded from one range interval, and made coherent, while the signal from the other range interval has a multiple split spectrum.

U.S. Pat. No. 6,125,328 to Baron et al discloses an improved system for obtaining data from the NEXRAD system.

U.S. Pat. No. 6,252,539 to Philips et al discloses a method for automatically generating weather alerts by collecting data to detect the presence of storm cells, their direction, location and speed.

The present invention is directed to a method to detect the bright band snow level in near real time from radar reflectivity and Doppler vertical velocity data collected with an atmospheric profiling Doppler radar.

SUMMARY OF THE INVENTION

This invention relates to a method to detect the bright-band snow level from radar reflectivity and Doppler vertical velocity data with an atmospheric profiling Doppler radar. The measurement may be made available to the public through the internet.

It is the primary object of the present invention to provide for an improved method to detect bright-band snow level in the atmosphere.

Another object is to provide for such a method using radar reflectivity and Doppler vertical velocity data.

These and other objects and advantages of the present invention will become apparent to readers from a consideration of the ensuing description and the accompanying drawings.

DESCRIPTION OF THE PREFERRED EMBODIMENT

The bright-band snow level (or the BBSL) results in an often sharp radar reflectivity enhancement. To detect the BBSL one choice would be to search only the radar reflectivity profile. However, enhancements in radar reflectivity can result from features other than the BBSL. These features include clear-air turbulence, the boundary-layer top, clouds and forms of stationary and intermittent clutter ( as discussed in the reference to A. B. White et al., 1996, entitled *Recent radar measurements of turbulence and microphysical parameters in marine boundary layer clouds*, Atmospheric Research, Volume 40, pages 177–221).

To narrow the search of the profile to the height region where the BBSL exists, the method of the present invention uses both radar reflectivity and Doppler vertical velocity profiles to detect the bottom portion of the BBSL. It is the bottom portion of the BBSL at which the vertical gradients of radar reflectivity and Doppler vertical velocity are negatively correlated. Once this is done, a search is then performed to find the peak radar reflectivity above this feature and the BBSL is assigned to the altitude of this peak. A consensus test is applied to sub-hourly values to produce a quality controlled hourly-averaged BBSL. The basic steps of the present invention can be used with an atmospheric profiling Doppler radar with an operating frequency that is sensitive to hydrometers and that does not suffer severe attenuation in rainfall. The method is applicable to radars that operate in the frequency range of roughly 50–3,500 MHz. One example of a commercially available radar is a 915 MHz Doppler wind profiler (see the reference to W. L. Ecklund et al., 1988, entitled A *UHF wind profiler for the boundary layer: Brief description and initial results.*, Journal Atmosphere Oceanic Technology, Vol. 5, pages 432–441).

Figure 1:
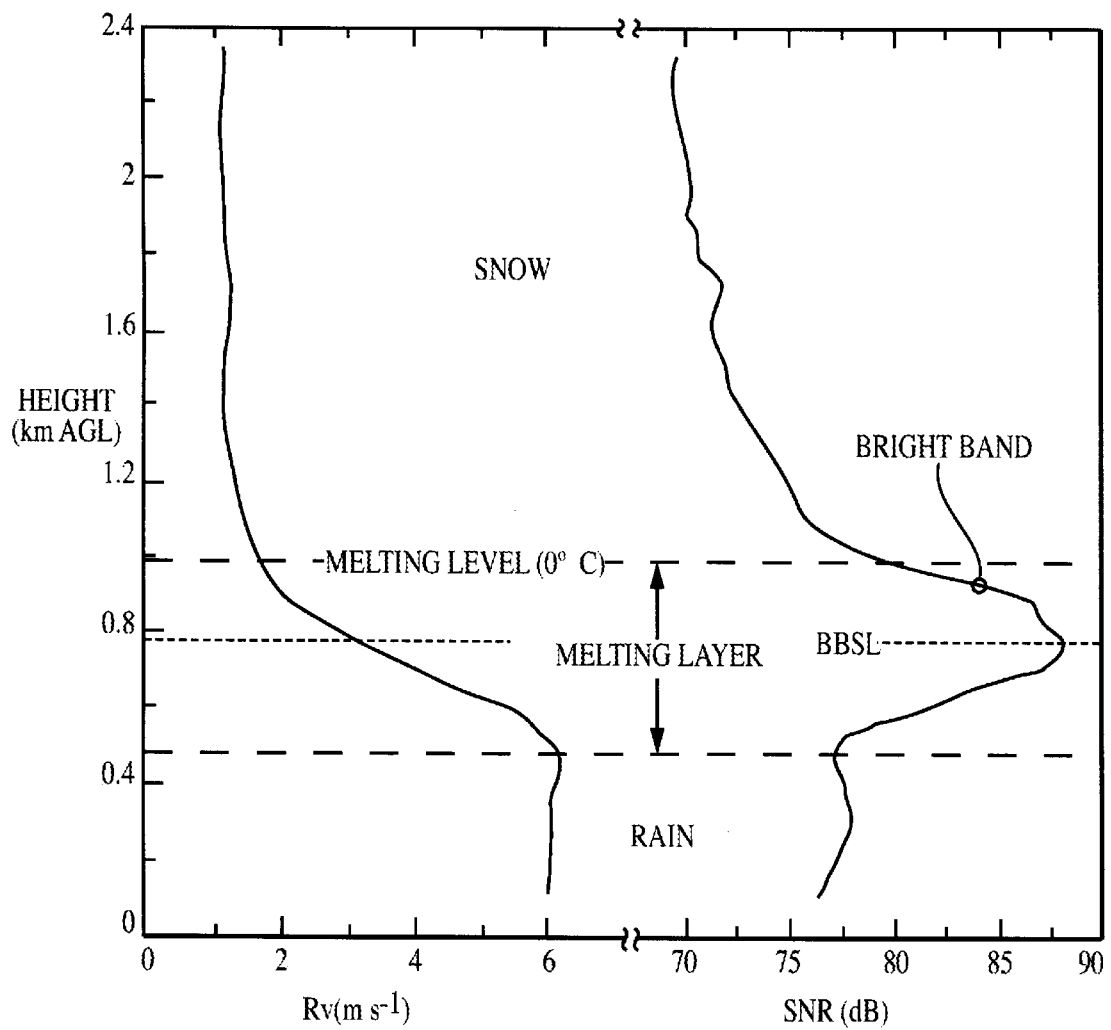
FIG. 1 is a graph of Doppler vertical velocity and radar reflectivity profiles obtained in rain containing a BBSL.

FIG. 1 is a graph of Doppler vertical velocity radar reflectivity and profiles obtained in rain containing a BBSL. The hourly median profiles of Doppler vertical velocity radar reflectivity in the form of ranged corrected signal-to-noise ratio (SNR), and (Rv; positive downward] are graphed as measured with the mentioned 915 MHz Doppler wind profiler. The measurements shown were made at Bodega Bay, Calif. between 1100 and 1200 Universal Time Coordinated (UTC) on Feb. 24, 2001. The BBSL is indicated by the solid lines at 0.772 km above ground level (AGL). The melting level or melting-layer top is measured by a rawinsonde launched from Bodega Bay at 1126 UTC and is shown by the dashed line at 0.994 km AGL. For illustration purposes, the bottom of the melting layer is estimated to be at the bottom of the bright band, which is also where Rv is largest.

In precipitation, the Doppler vertical velocity, Rv, provides a reflectivity-weighted, integrated estimate of the fall velocity for particles distributed within the radar scattering volume. A vertical gradient in Rv is associated with the BBSL because the fall velocity generally increases as snowflakes melt into rain. Typically this takes place from less than 2 meters per second (m s) m s$^{-1}$ for snow to greater than 5 m s$^{-1}$ for rain. Melting into rain decreases the drag on the snowflakes and increases their density. In rain, radar reflectivity factor, Z, and Rv are usually positively correlated because larger drops fall faster and increase Z, which is proportional to the drop diameter raised in to the sixth power, $$Z = \int_0^\infty N(D)D^6 dD, \quad (1)$$

where N(D) is the number concentration of drops existing at diameter D. The radar equation relates Z to radar reflectivity, η. For hydrometers small enough to be considered Raleigh scatterers, the radar equation can be expressed as, $$Z = \frac{\eta \lambda^4}{|K|^2 \pi^5}, \quad (2)$$

where λ is the radar wavelength and |K|, is the dielectric factor. This dielectric factor is approximately equal to 0.93 for water and 0.21 for ice. The range-corrected signal-to-noise ratio (SNR) computed from the Doppler radar spectrum is directly proportional to η. The constant of proportionally involves radar constants, operating parameters, and a calibration factor, which depends on the antenna gain and the system noise temperature. To apply our method of BBSL, detection, it is not necessary for the radar to be calibrated, making it possible to apply the method of the present invention to a wide variety of Doppler radars for which radar calibration is not possible. Therefore, we can use signal-to-noise ratio (SNR) in place of η.

The upper portion of the bright band results as snow or ice particles fall through the melting level and obtain wet surfaces as they begin to melt. This process makes the particles sticky, and aggregation leads to larger particles. Some particle aggregation occurs above the melting level, as well. As shown in FIG. 1, SNR increases and is positively correlated with Rv in the upper portion of the bright band because of the increasing particle size. However, SNR, also increases because |K| is greater for water than for ice. As the particles undergo further melting their density increases, which leads to larger fall velocities and smaller particles because mass is conserved. The SNR decreases and is negatively correlated with Rv in the lower portion of the bright band because the particles shrink, but their fall velocities increase. The SNR also decreases because of the vertical mass flux divergence resulting from the increased fall velocities, which causes N(D) to decrease (see reference, D. Atlas, 1964, entitled *Advances in radar meteorology*, Advanced Geophysics, volume 10, pages 317–478).

The BBSL is lower than the melting level. The melting level is the altitude at which the temperature is 0° C. However, snow can continue to fall up to 300 meters below the melting level because of the time required at temperatures above freezing to melt the snow during its descent. The reference to C. D. Whiteman, 2000 entitled *Mountain Meteorology; Fundamentals and Applications*, Oxford University Press, New York, on page 35 describes this snow fall characteristic in detail.

Figure 2:
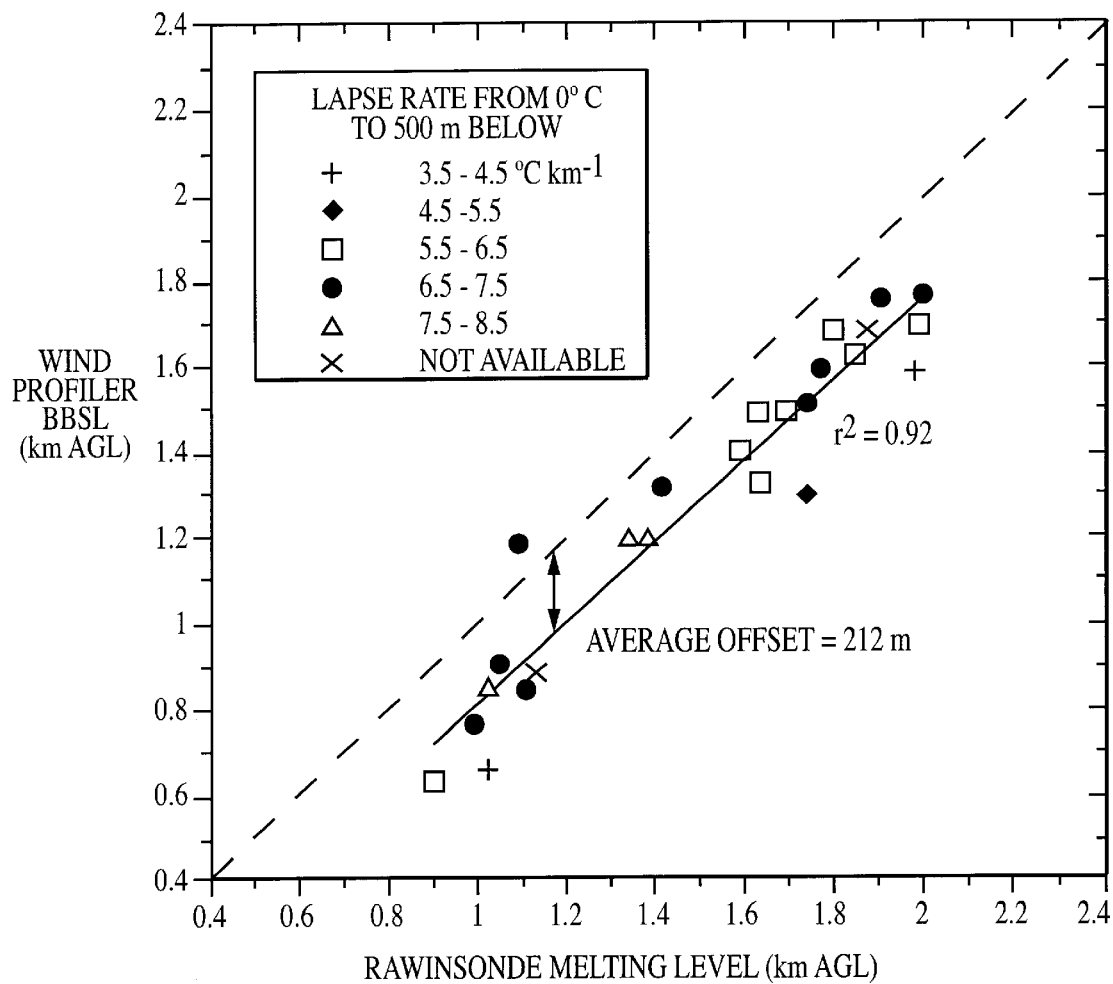
FIG. 2 is a comparison of BBSLs derived from wind profiler Doppler spectral moments with melting levels and temperature lapse rates below the melting levels measured with weather balloons.

During an experiment referred to as the Pacific Land-falling Jets Experiment (PACJET) that took place between January and March 2000, BBSLs were computed using subhourly spectral moment data from the 915 MHz wind profiler at Bodega Bay, Calif. and compared to the melting levels and temperature lapse rates below the melting levels measured by serial rawinsondes launched from the same location. FIG. 2 is a comparison of BBSLs derived from wind profiler Doppler spectral moments and melting levels measured with rawinsondes or weather balloons. These data are binned according to the temperature lapse rate measured below the melting level. The correlation and average offset are given along with lines of linear regression (shown as solid) and 1:1 agreement (shown as dashed).

To derive the data of FIG. 2, a total of 56 rawinsondes ( weather balloons) penetrated the melting level, and an hourly consensus BBSL was detected in the hour surrounding the melting level measurement time in 25 of these cases. On average the consensus BBSLs were 212 meters lower than the melting levels as measured by the rawinsondes. This experimental result demonstrates that for the types of winter storms that typically impact the United States West Coast, the BBSL approximates the snow level. The larger differences between the melting levels and BBSLs occurred with the smaller temperature lapse rates because of the increased fall distance required to completely melt the ice particles. For larger lapse rates, the agreement between the melting levels and BBSLs was improved. Significant improvement did not occur for lapse rates above approximately 6.5° C. km$^{-1}$.

Because radar reflectivity in the form of range-corrected signal-to-noise ratio (SNR) is used in the present invention, the noise profile must be examined for height consistency. In rain the noise power can be artificially enhanced. If the backscatter signal fills or nearly fills the spectral Nyquist interval, the noise power may be enhanced by the tails of the signal. Increased noise power may also result if the signal saturates the receiver. To find the correct noise power, the top five range gates in the profile are averaged. These range gates are where the noise is unaffected by the problems mentioned. After doing so, the SNR profile is regenerated using the average noise power from the top of the profile. Using this method allows for temporal changes in the noise power that may result from variations in galactic noise or changes in radar hardware performance.

The next task was to decide whether a subhourly radar SNR-Rv profile pair should be analyzed for a BBSL. By doing so, so-called false alarms (i.e. detecting a BBSL when a bright band does not exist) are eliminated. One option is to use a rain gauge collocated with the radar to determine when it is raining. Rain is defined by a minimum rainfall measurement of at least 0.01 of an inch. This technique was used to produce the BBSL measurements during the PAC-JET. Realizing that not all radar sites have rain gauges, a technique was developed that relies solely on the radar Doppler spectral moments to determine when to invoke the BBSL detection scheme. This scheme is applied when $_{13}$ at least three range gates in the lowest 3 km of the profile measure values of $Rv \geq 2.5$ m s$^{31\ 1}$ and SNR$\geq 52$ dB. The SNR threshold is applied to eliminate measurement noise caused by low signal power. The RV threshold is used to identify profiles that likely contain rain and is based on a study in 1996 by F. M. Ralph et al. entitled *Precipitation identification from radar wind profiler spectral moment data: Vertical velocity histograms, velocity variance, and signal power-vertical velocity correlations*. Journal Atmosphere Oceanic Technology, Vol. 13, pages 545–559. That study identified the Rv and SNR characteristics of different types of precipitation.

A 915-MHz wind profiler data set was collected at Bodega Bay, Calif. during the California Land-falling Jets Experiment (CALJET) as reported by F. M. Ralph et al. in 1999 in the work entitled *The Califomia Land-falling Jets Experiment (CALJET): Objectives and design of coastal atmosphere-ocean observing system deployed during a strong El Nino*. Reprints, were available at the Third Symposium on Integrated Observing Systems, held Jan. 11–15, 1999, Dallas, Tex., AMS, Boston , pages 78–81. The large number of rainfall events captured in this data set provided an opportunity to do extensive testing and evaluation of the present invention. As reported in the below Table 1, the method described has the advantage of selecting periods for BBSL detection when the precipitation does not reach the surface or when the rain rate is insufficient to be detected by a rain gauge. The fact that periods when at least one bright band was detected accounts for only 74% of the rainfall observed by the rain gauge used in this study is not necessarily an indication that the method underestimates BBSL occurrence. Precipitation can be generated without the benefit of ice microphysics, which yields reflectivity profiles that do not contain a bright band. For example, using a 2875-MHz research radar that is better suited to bright-band detection than the 915-MHz wind profiler radar used in the present invention, A. B. White et al. found that non-bright-band rain accounted for 37% of the total rainfall observed at a coastal mountain site, approximately 35 km from Bodega Bay, Calif., during the same CALJET period (January–March, 1998). The reference work of A. B. White, 2001, entitled *Process partitioning of rainfall enhanced by coastal orography*, available as reprints at the Symposium on Precipitation Extremes: Prediction, Impacts and Response, Jan. 14–19, 2001, Albuquerque, N.Mex., AMS, Boston, pages 8–11, describes this finding.

TABLE 1

| Bodega Bay, California | Occurrences (h) | Rainfall (mm) |
| --- | --- | --- |
| Measurable rain observed at surface | 462 | 818 |
| At least one BBSL detected in hour | 289 (63%) | 607 (74%) |
| Passed BBSL consensus test | 216 (47%) | 509 (62%) |
| No measurable rain observed at surface | 1698 | |
| At least one BBSL detected in hour | 95 (6%) | |
| Passed BBSL consensus test | 49 (3%) | |

TABLE 1 reveals data on BBSL detection at Bodega Bay, Calif. during the California Land-falling Jets Experiment (CALJET) of January–March 1998 for hourly periods with and without rainfall observed at the surface.

If a SNR-Rv profile pair is selected for BBSL analysis, the following criteria are used to determine whether a bright band exists. Referring to the schematic drawing shown in FIG. 3, the profiles are searched from the bottom up. If an increase in SNR of 2.5 dB and a decrease in Rv of 1.5 m s$^{-1}$ occur over an altitude span of 210 meters (three ranges gates for the radar used in this study), the profile pair is determined to contain a bright band, as long as $Rv \geq 0.8$ m s$^{-1}$ and SNR$\geq 62$ dB at each of the altitude bounds or the top and bottom of the box shown in FIG. 3. If a bright band exists, a search is performed to find the peak SNR in the 525-meter layer above the altitude at the base of the SNR jump, and the BBSL is assigned to the altitude of the peak. Using neighboring range gates in height, or an altitude space of 105 meters instead of 210 meters required the use of a smaller SNR and Rv jump criteria, which increased the number of false alarms. The minimum Rv and SNR thresholds help ensure that some type of precipitation (ice or liquid) is falling and further reduces the chance for false alarms. Note that the SNR threshold used for precipitation (62 dB) is, coincidentally, an order of magnitude greater than the SNR threshold for noise (52 dB). When applying this technique to radars with different sensitivity and/or vertical sampling resolution, the SNR and Rv jump criteria and thresholds should be reevaluated.

Figure 3:
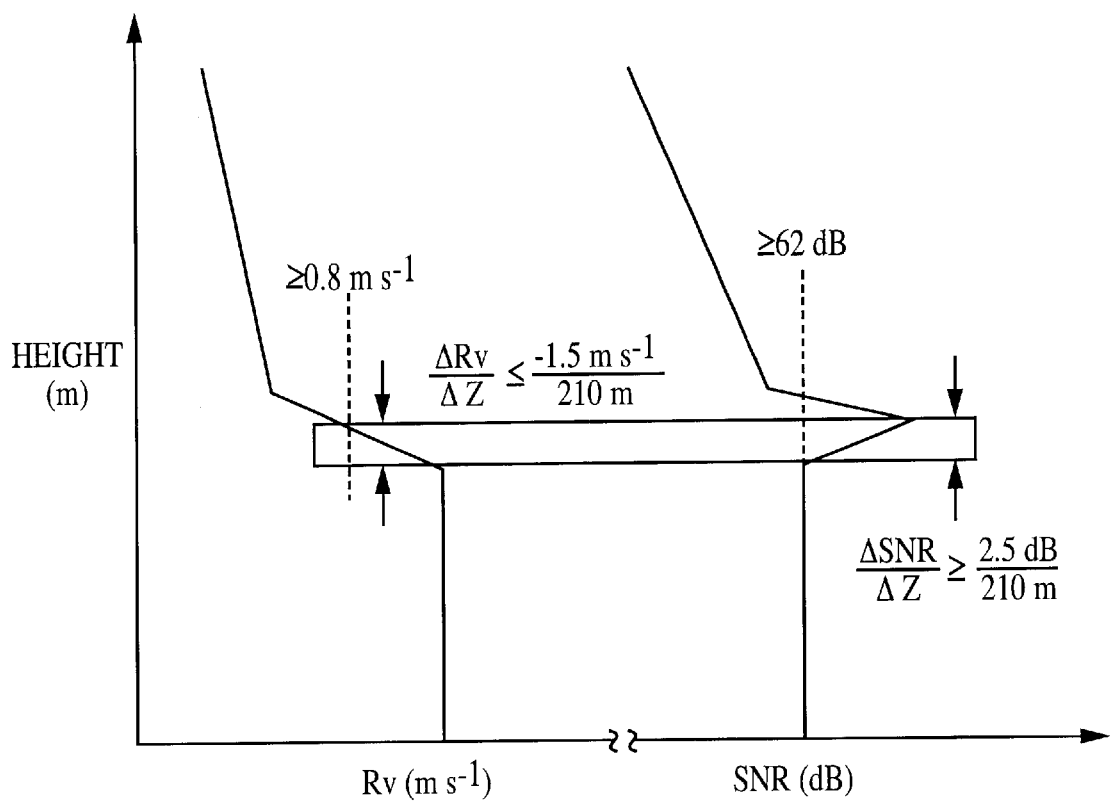
FIG. 3 is a schematic showing the criteria used to identify a BBSL in vertical profiles of Doppler vertical velocity radar reflectivity.

The FIG. 3 schematic shows the classic bright-band structure in vertical profiles of Doppler vertical velocity and radar reflectivity. Rv is positive downward. The magnitudes of the 210-meter layer jumps (denoted by Δ's and thresholds (dashed lines) in Rv and SNR used to detect the lower portion of the bright band are indicate.

The BBSLs deduced from individual SNR-Rv profile pairs recorded within the hour are subjected a data quality control to time series values to obtain an hourly-averaged bright-band snow level and to reject outliers. One type of test used is a control consensus test that requires that at least three BBSLs are detected within the hour. All other cases are thrown out for lack of confidence. For the radar sampling parameters used in this study, this eliminates the possibility of detecting a BBSL in rain showers lasting less than about 15 minutes over the course of a 1-hour period. The consensus test consists of establishing a window of acceptable variability and rejecting values that lie outside of the window. To establish the window, a median is computed of all BBSLs detected within the hour. Only those heights that falls within+or −210 meters of the median are accepted in the consensus. The data for the hour are rejected if less than three BBSLs pass this consensus test. Otherwise an average is computed of all of the values accepted by the consensus test and the average is reported as the consensus BBSL for the hour i,e., one applies a consensus test to time series values to obtain an hourly-averaged bright-band snow level.

Figure 4:
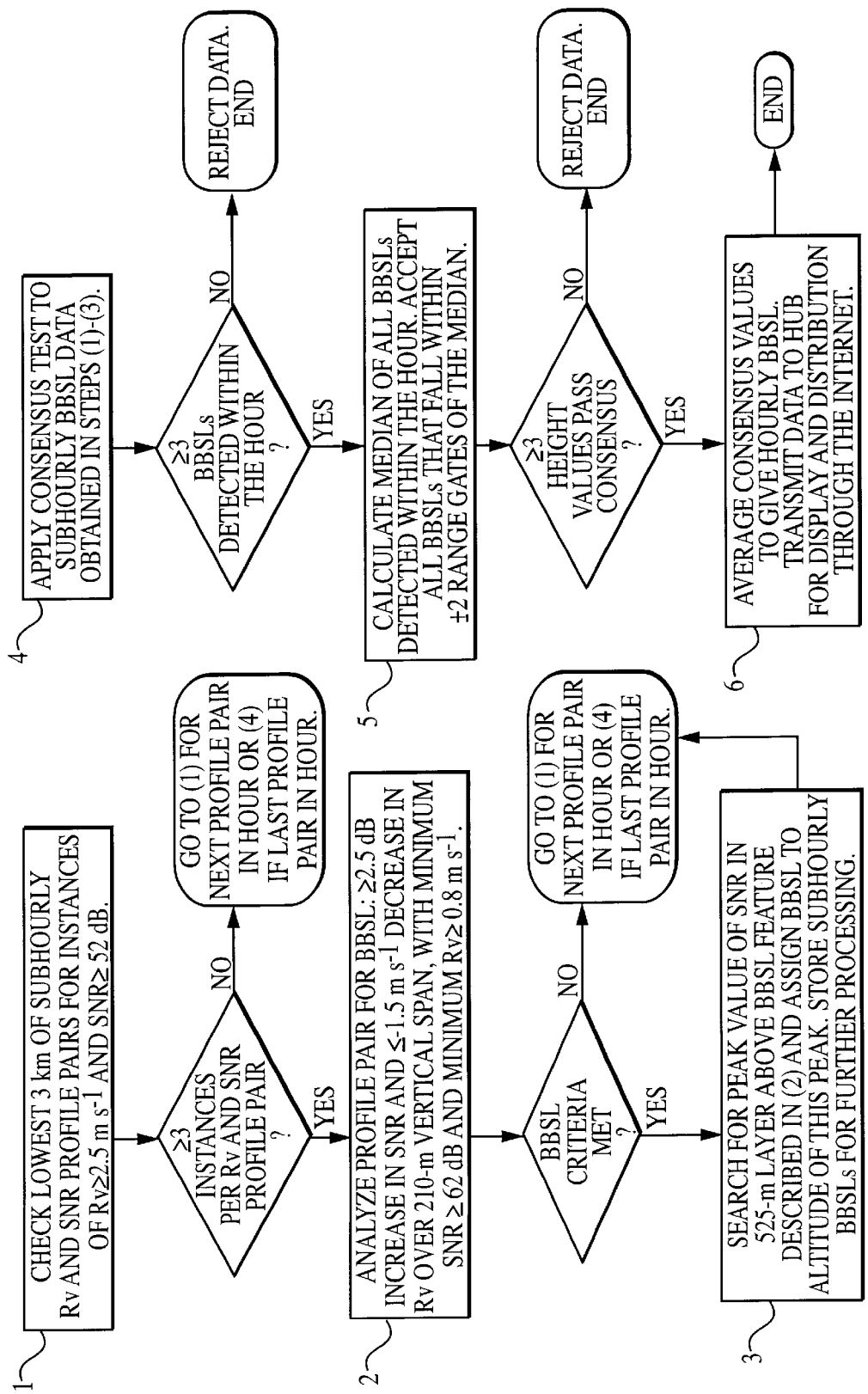
FIG. 4 is a flowchart of the method to provide BBSL.

The FIG. 4 flowchart describes the steps involved in BBSL detection and data quality control via the consensus test.

In the FIG. 4 flowchart a method is shown that provides the BBSL. This method can be applied, in near-real time to the Doppler vertical velocity (Rv) and range-corrected sign-to-noise ratio (SNR) profiles recorded by a conventional 915-MHz Doppler wind profiler radar system. Steps designated (1)–(3) describe the BBSL detection scheme, and steps (4)–(6) describe the consensus test applied to reject outliers and provide a quality-controlled hourly-averaged BBSL.

Figure 5:
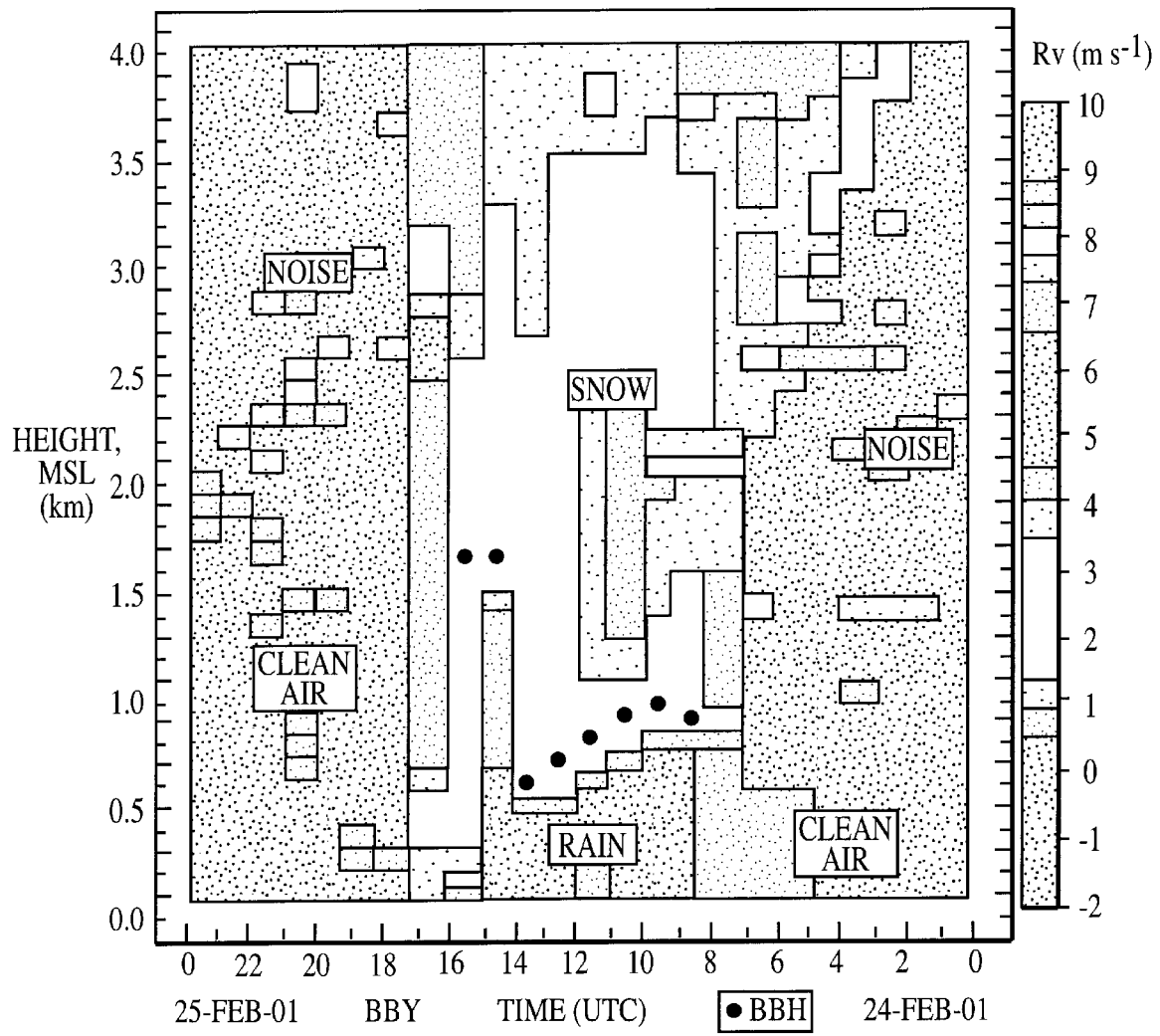
FIG. 5 is a example of a BBSL image displayed on a web page.

The real-time component of the present invention consists of four processing steps. Step one is to access the spectral moment-level data from a radar. Step two is to execute the BBSL detection program. Step three is to transfer the BBSL output data files back to the central data hub. The last step, step four, is to produce and post graphical images on the internet. The first step requires I/O synchronization with the radar data acquisition system since new data is actively acquired and written to the file archive with exclusive access rights by the data acquisition system. Because the data acquisition system writes newly acquired data to disk at the end of each radar sampling period (typically 20–60 seconds), the time between disk writes is used to access the necessary radar data. This data access period is identified by waiting for file-change-notification kernel objects to become signaled. After the radar data is accessed and stored on disk, the BBSL detection program (step two) is spawned by a process control routine. The resulting BBSL output data files are then transferred back to a central data hub (step 3) using dial-up internet protocols. Once the BBSL data files are received, graphical images of contoured vertical radial velocity and BBSL are created. Lastly, using automated scripting, the BBSL images are made accessible through the internet (step 4). FIG. 5 is a example of BBSL image displayed on a web page.

The FIG. 5 web page is for the Pacific Land-falling Jets Experiment, previously mentioned. The rectangles (normally colored) display hourly averaged values of Doppler vertical velocity ( Rv; positive downward). The BBSL data are indicated by dots. The time axis proceeds from right to left. The notation BBY stands for Bodega Bay, Calif. The displayed image has been annotated with words to indicate patterns of Rv corresponding to radar backscatter from different atmospheric media. Noise refers to measurement noise caused by low signal power.

Conventional computer hardware, unless stated to the contrary, is used to implement the method steps disclosed in the present invention and is therefore, not described in detail. The computer programs used to perform the steps stated have been specifically written to perform the steps indicated.

In summary, the present invention demonstrates a method for estimating the BBSL, in near real time, from Doppler spectral moments recorded by an atmospheric profiling Doppler radar and distributing results through the internet. The BBSL provides a better estimate of the snow level than the melting level. In addition to the weather forecast community to predict and monitor snow level, the information provided by the present invention can benefit a large number of individuals and organizations who require or desire information about the snow level. Examples include, but are not limited to, road maintenance crews, hydrologists, emergency managers, electric utilities, aviators, and the ski industry.

Although the method of detecting bright-band snow level according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What we claim as our invention is:

1. A method of detecting bright-band snow level comprising the steps of:
   a. searching the atmosphere for the bright-band snow level by radar reflectivity enhancement,
   b. using Doppler vertical velocity profiles to detect the bottom portion of the bright-band snow level in question in conjunction with step a.,
   c. searching to find the peak radar reflectivity above the detected bottom portion of the snow level found in step b,
   d. assigning the bright-band snow level to the peak altitude found in step. c, and
   e. applying a data quality control to time series values to obtain an hourly-averaged bright-band snow level.

2. The method as claimed in claim 1, wherein the data quality control of step e. is used to reject outliers.

3. The method as claimed in claim 1, wherein the real time data component is obtained from the results of steps a–e.

4. The method as claimed in claim 3, wherein the real time component is obtained by:
   f. accessing the spectral moment level data from a radar;
   g. executing a detection program;
   h. transferring the output data of step g. back to a central data hub; and
   i. produce and post graphical images on the Internet based on the data in the central data hub of step h.

* * * * *